(12) United States Patent
Yonezawa

(10) Patent No.: US 11,366,342 B2
(45) Date of Patent: Jun. 21, 2022

(54) BINOCULAR LOUPES

(71) Applicants: Kikuko Yonezawa, Nagano (JP); MEDSOLEIL CO., LTD., Nagano (JP)

(72) Inventor: Kikuko Yonezawa, Nagano (JP)

(73) Assignees: Kikuko Yonezawa, Nagano (JP); MEDSOLEIL CO., LTD., Nagano (JP)

( * ) Notice: Subject to any disclaimer, the term of this patent is extended or adjusted under 35 U.S.C. 154(b) by 46 days.

(21) Appl. No.: 16/727,244

(22) Filed: Dec. 26, 2019

(65) Prior Publication Data

US 2020/0133029 A1 Apr. 30, 2020

Related U.S. Application Data

(63) Continuation-in-part of application No. 15/740,128, filed as application No. PCT/JP2016/069704 on Jul. 1, 2016, now abandoned.

(30) Foreign Application Priority Data

Jul. 2, 2015 (JP) ................................. 2015-133785

(51) Int. Cl.
 *G02C 7/08* (2006.01)
 *G02C 9/00* (2006.01)
(52) U.S. Cl.
 CPC ............. *G02C 7/086* (2013.01); *G02C 7/088* (2013.01); *G02C 9/00* (2013.01); *G02C 2200/02* (2013.01)
(58) Field of Classification Search
 CPC .......... G02C 9/00; G02C 7/088; G02C 7/086; G02C 2200/02; G02B 25/00–005; G02B 7/002; G02B 15/10; G02B 23/18; G02B 25/004; A61B 2090/3616; A61B 2090/502
 USPC ............................... 359/481, 830; 292/251.5
 See application file for complete search history.

(56) References Cited

U.S. PATENT DOCUMENTS

| | | | | |
|---|---|---|---|---|
| 2,953,970 A | * | 9/1960 | Maynard | G03B 17/12 359/611 |
| 6,295,702 B1 | * | 10/2001 | Bauer | A45C 13/1069 24/303 |
| 2009/0231699 A1 | * | 9/2009 | Nakamura | G02B 7/002 359/481 |
| 2018/0039067 A1 | * | 2/2018 | Oren | G02C 7/088 |
| 2018/0284484 A1 | * | 10/2018 | Lindsey | G02C 7/088 |

* cited by examiner

*Primary Examiner* — George G. King
(74) *Attorney, Agent, or Firm* — Manabu Kanesaka

(57) ABSTRACT

To provide binocular loupes capable of ensuring an optimal focal distance for a user using a simple operation, focus adjustment units disposed in eyepiece units of a pair of left and right loupe bodies of binocular loupes are provided with focus adjustment lenses, and holding rings having magnetic bodies into which the focus adjustment lenses are fitted. The holding rings are mounted in contact with correction lenses constituting optical systems inside the loupe bodies, are drawn and held by magnet rings. By this means, it is possible to readily replace the focus adjustment lenses by mounting the lenses detachably from the loupe bodies, and it is possible to ensure an optimal focal distance.

1 Claim, 17 Drawing Sheets

BINOCULAR LOUPES

CROSS-REFERENCE TO RELATED APPLICATION

This is a continuation-in-part application of Ser. No. 15/740,128 filed on Dec. 27, 2017, which is a National Phase of International Application No. PCT/JP2016/069704 filed on Jul. 1, 2016, and claims priority from Japanese Application No. 2015-133785, filed on Jul. 2, 2015, the disclosure of which is hereby incorporated by reference herein in its entirety.

TECHNICAL FIELD

The present invention relates to binocular loupes used in medical operations and precision work operation.

BACKGROUND ART

Binocular loupes have conventionally been used widely in each field of medical field, precision work, jewel processing and the like, as means for enlarging a local visual object on hand to visually identify. In these fields, high accuracy is required in work and operation, and the binocular loupes are provided with bright clear image quality, in addition to excellent resolution, wide visual diameter, predetermined focal distance and the like. Further, for scaling adjustments of the loupes, adjustable types are also prepared according to use.

Then, particularly, in binocular loupes used in the medical field, because of being involved in life, the vision correction and astigmatism correction by the binocular loupes are required to correctly adapt to vision of practitioner.

However, in conventional binocular loupes, regardless of high accuracy required in manual operation of medical practitioners, since it is not possible to adapt the focal distance of the lens, which corrects vision of far distance or near distance of the practitioner, to the vision of the operator changing during operation, there is the problem that variations occur in sight accuracy due to changes in vision. In other words, regardless of that the vision of a human always changes corresponding to the extent of physical conditions and fatigue, and further changes in the morning and afternoon even on the same day, it is not possible to adapt the conventional binocular loupes to varying vision of a practitioner, and the practitioner has been forced to operate using the binocular loupes in an improper vision state.

Further, corresponding to the type of procedure e.g. procedure in a narrow eyesight range or procedure in a wide eyesight range, the need arises to change a distance between the procedure/operation portion and the binocular loupes, and therefore, a single practitioner needs to beforehand prepare a plurality of types of binocular loupes with different focal distances.

DISCLOSURE OF INVENTION

Problems to be Solved by the Invention

The present was made in view of the above-mentioned problem, and it is an object of the invention to provide binocular loupes capable of ensuring an optimal focal distance for a wearer, using a simple operation such that a focus adjustment lens is attached and detached.

Means for Solving the Problem

In order to solve the above-mentioned problem, the present invention is characterized in that binocular loupes having an optical system to enlarge an object on hand to look is provided with a pair of loupe bodies, and focus adjustment units disposed in eyepiece units of the loupe bodies, the focus adjustment units include focus adjustment lenses having magnetic bodies at peripheral edges, and holding rings into which the focus adjustment lenses are fitted, and that the focus adjustment lenses are held detachably by the loupe bodies by the magnetic bodies being attracted to magnets.

In one Embodiment, each of the magnets has the shape of a ring, is fitted into the loupe body to come into contact with an inner peripheral edge of the eyepiece unit of the loupe body, and is thereby held.

In another Embodiment, the invention is characterized in that each of the loupes is provided with the holding ring that has an inside diameter substantially equal to an outside diameter of the focus adjustment lens and that is disposed to come into contact with the inner peripheral edge of the eyepiece unit, the magnet ring is provided with a lens receiving unit having an inside diameter substantially equal to the outside diameter of the focus adjustment lens, and a press unit having an inside diameter smaller than the outside diameter of the focus adjustment lens, and that the lens receiving unit cooperates with the holding ring fitted into the loupe body to come into contact with the peripheral edge of the eyepiece unit to hold the focus adjustment lens.

It is possible to form the magnet body using a ring made of metal into which the focus adjustment lens is fitted.

Further, it is also possible to form the magnetic body using a thin film formed by applying or spraying fine particles of magnetic material with small particle diameters to the surface, or a thin film of magnetic material formed by sputtering and deposition.

In still another Embodiment, the binocular loupes are provided with tube-shaped holders into which are inserted eyepiece side ends of the loupe bodies, one end portions of the holders are provided with first attachment units that hold the focus adjustment units detachably, the other ends are provided with second attachment units that hold the loupe bodies detachably, the first attachment units include the magnets that attract the magnetic bodies of the focus adjustment lenses, the holders are configured to be fitted and fixed to holes formed in carrier lenses for holding the holders respectively attached to left and right rims of a glasses frame, and the binocular loupes are thereby provided where each of the focus adjustment units and the binocular loupes is removable.

The first attachment units constitute the magnets with pins spaced at regular intervals in peripheral edges of end faces of the holders to which the focus adjustment units are attached, the holding rings include hole portions into which the pins are inserted, the magnetic bodies of the focus adjustment lenses are attracted by inserting the hole portions into the pins, and the focus adjustment units are thereby attached to the holders via the first attachment units.

Herein, a plurality of types of focus adjustment units with different focal distances by the focus adjustment lenses is beforehand prepared, and one type is selected from among the types and is attached to the holders via the first attachment units.

The second attachment units are comprised of hook-shaped grooves comprised of insertion holes and locking holes formed on insertion sides of the loupe bodies of the holders, protrusions formed on side faces of the loupe bodies are fitted into the locking holes via the insertion holes, and the loupe bodies are thereby attached to the binocular loupes.

Herein, a plurality of types of loupe bodies with different magnifications is prepared, and one type is selected from among the types, and is attached to the holders via the second attachment units.

Effect of the Invention

According to the binocular loupes of the present invention, using a simple operation for inserting the focus adjustment lens in the loupe body, it is possible to ensure a focal distance adapted to a wearer at the time with ease. Accordingly, the need is eliminated to provide a plurality of focus adjustment units corresponding to the focal distance, and inexpensive binocular loupes are provided.

BRIEF DESCRIPTION OF DRAWINGS

FIG. 7A illustrates the focus adjustment unit in a disassembled state, and FIG. 7B illustrates a state in which the focus adjustment unit is assembled into the eyepiece side of the loupe body.

FIG. 8A illustrates the focus adjustment unit in a disassembled state, and FIG. 8B illustrates a state in which the focus adjustment unit is assembled into the eyepiece side of the loupe body.

BEST MODE FOR CARRYING OUT THE INVENTION

Binocular loupes are configured by attaching each of loupe bodies for both left and right eyes to a glasses frame or head band. Then, the binocular loupes with the loupe bodies attached to the glasses frame have two types including one type of directly supporting by the glasses frame and another type of fitting into holes cut in the glasses lenses (carrier lenses) to attach.

The present invention is applicable to any of binocular loupes described above, and the binocular loupes configured by attaching the loupes to carrier lenses will be described below in detail with reference to drawings.

Figure 1:
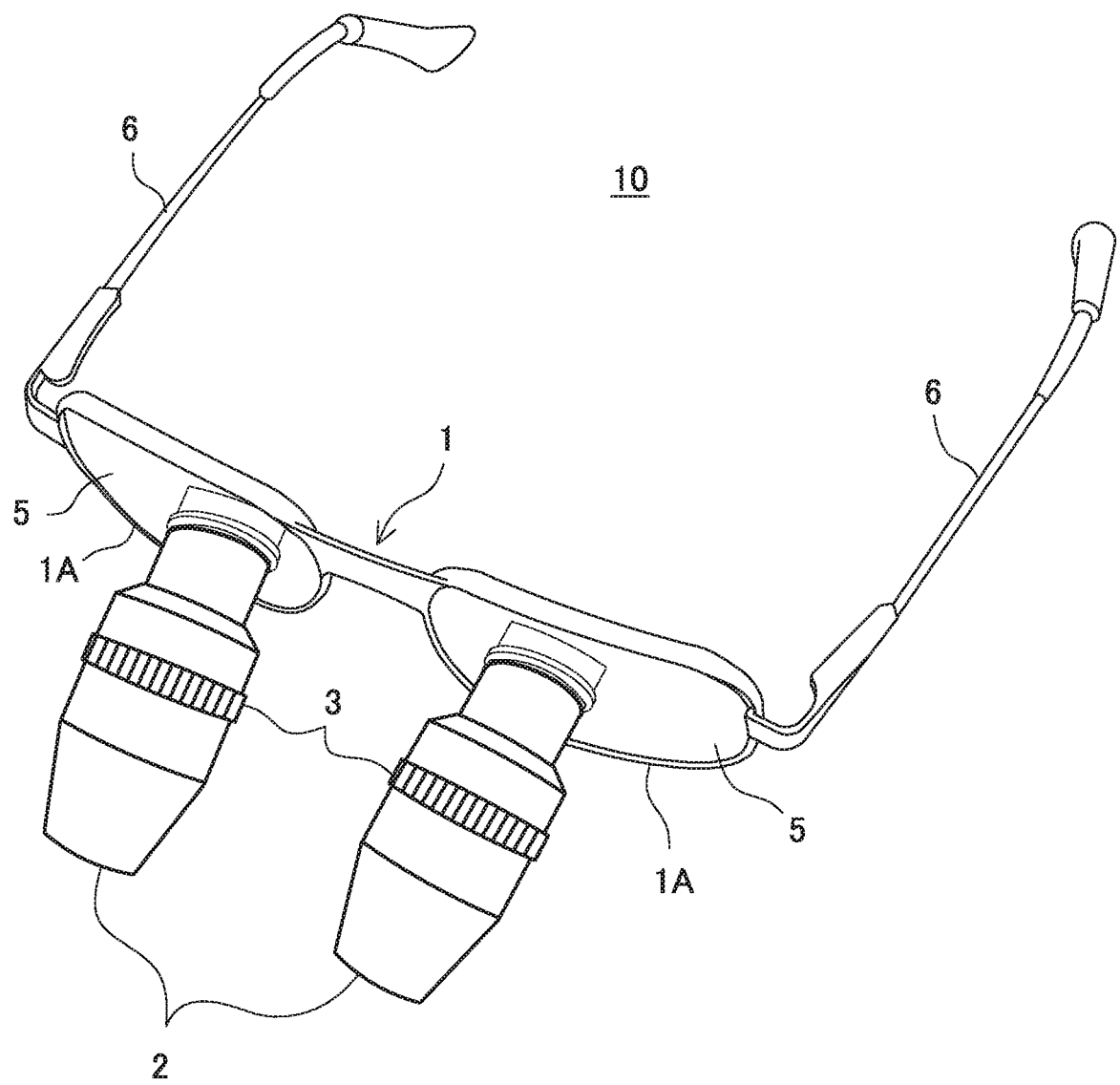
FIG. 1 illustrates an entire configuration view of binocular loupes according to an Embodiment of the present invention.

Binocular loupes 10 shown in FIG. 1 are provided with a glasses frame 1, loupe bodies 2 that correspond to both left and right eyes to enlarge an image targeted for operation, and left and right carrier lenses 5 to attach the loupe bodies 2.

The glasses frame 1 has substantially the same structure as normal glasses, and is comprised of rims 1A into which the carrier lenses 5 are fitted, and temple portions 6 put on ears of an observer. Used as materials forming the glasses frame 1 and temple portions 6 are metal such as titanium, synthetic resin and the like hard to rust with flexibility.

Further, materials forming the carrier lenses 5 respectively fitted into rims 1A for both eyes do not need to be always transparent, but are preferably transparent to widen the eyesight in the hand direction of the observer. Further, in the case of requiring correction of vision, corrective lenses are used, and in the case of no need of correction of vision, the lenses may be simple transparent glass. Materials of the lens in this case are glass or plastic.

Figure 2:
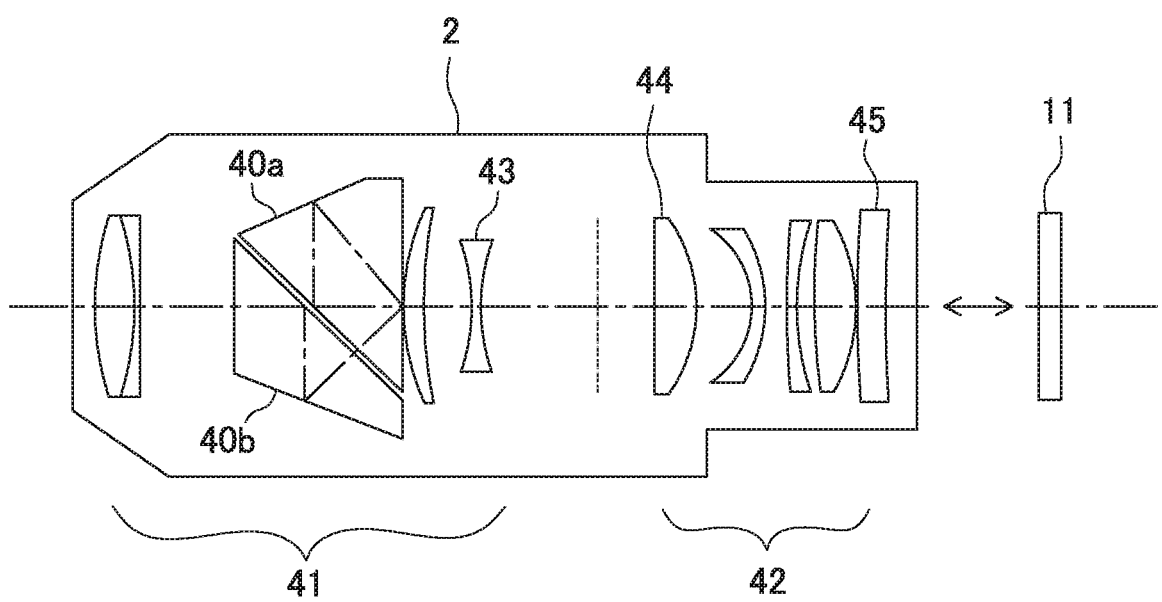
FIG. 2 illustrates a schematic view of a configuration of an optical system of the binocular loupes according to the Embodiment of the present invention.

As shown in FIG. 2, in the loupe body 2, an objective lens group 41 and eyepiece group 42 are disposed inside a lens tube along a center axis (optical axis) of the tube. In the objective lens group 41, in order not to decrease image quality in increasing magnification, prisms 40$a$, 40$b$ are disposed to refract light to be incident. Then, corrective lenses (prescription lenses) 45 to correct vision of a user of the binocular loupes 10 are disposed in end portions on the eyepiece side of the loupe bodies 2, and in no need of correcting vision, as a substitute for the corrective lenses 45, simple glass lenses are disposed to protect the optical system inside the loupe bodies 2.

Although not shown in the figure in detail, it is configured to enable the angle of view of the loupe body 2 to be adjusted, for example, in a range of 3.3 to 4.8 magnifications, by rotating each ring 3 (FIG. 1) provided in the outer region of the loupe body 2 to shift each of a lens 43 of the objective lens group 41 and a lens 44 of the eyepiece group 42 in the optical axis direction. In addition, in the loupe body 2, it is possible to also use the body where distances between lenses are all fixed and the angle of view is a certain magnification.

Figure 3:
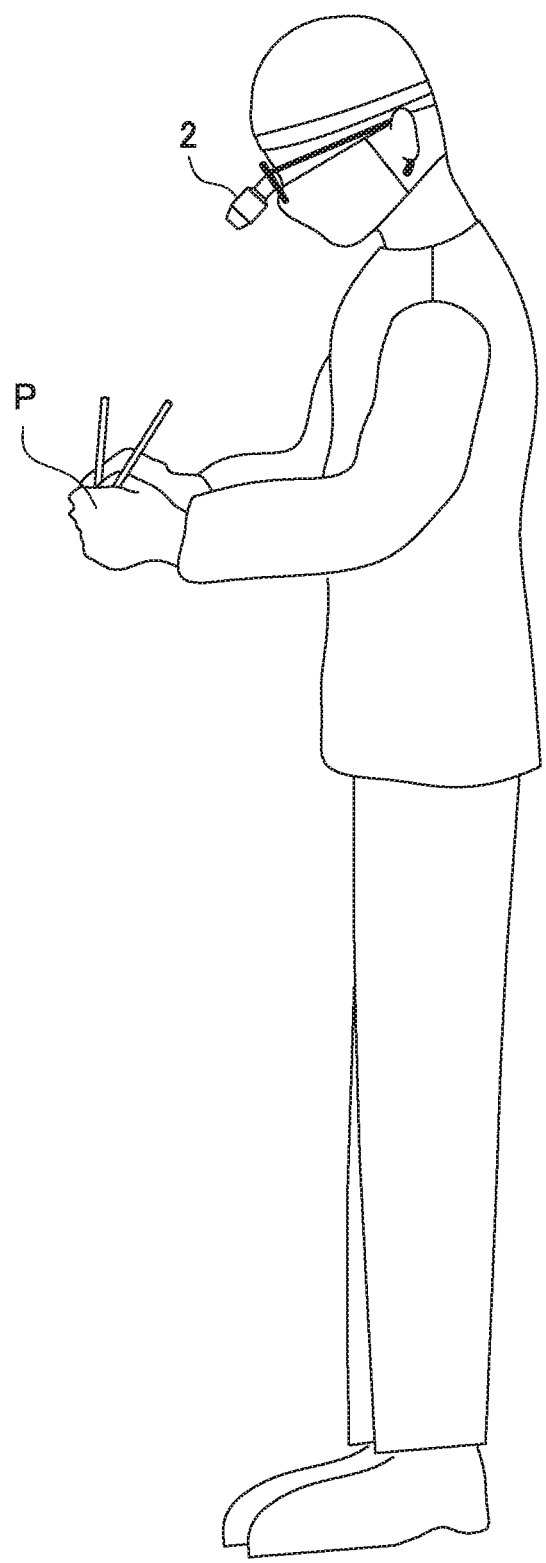
FIG. 3 illustrates an explanatory view of a state of performing operation with the binocular loupes worn.

Such binocular loupes 10 are worn on the face with the temple portions 6 put on ears of the user. As shown in FIG. 3, in the case of using when a surgeon performs surgery, the surgeon enlarges and observes an object in a surgical portion P at the front end of surgical instruments in hands through the left and right loupe bodies 2, and at this point, the surgeon drops the line of sight so as to peep through the left and right loupe bodies 2, and stares at the surgical portion P.

Figure 4:
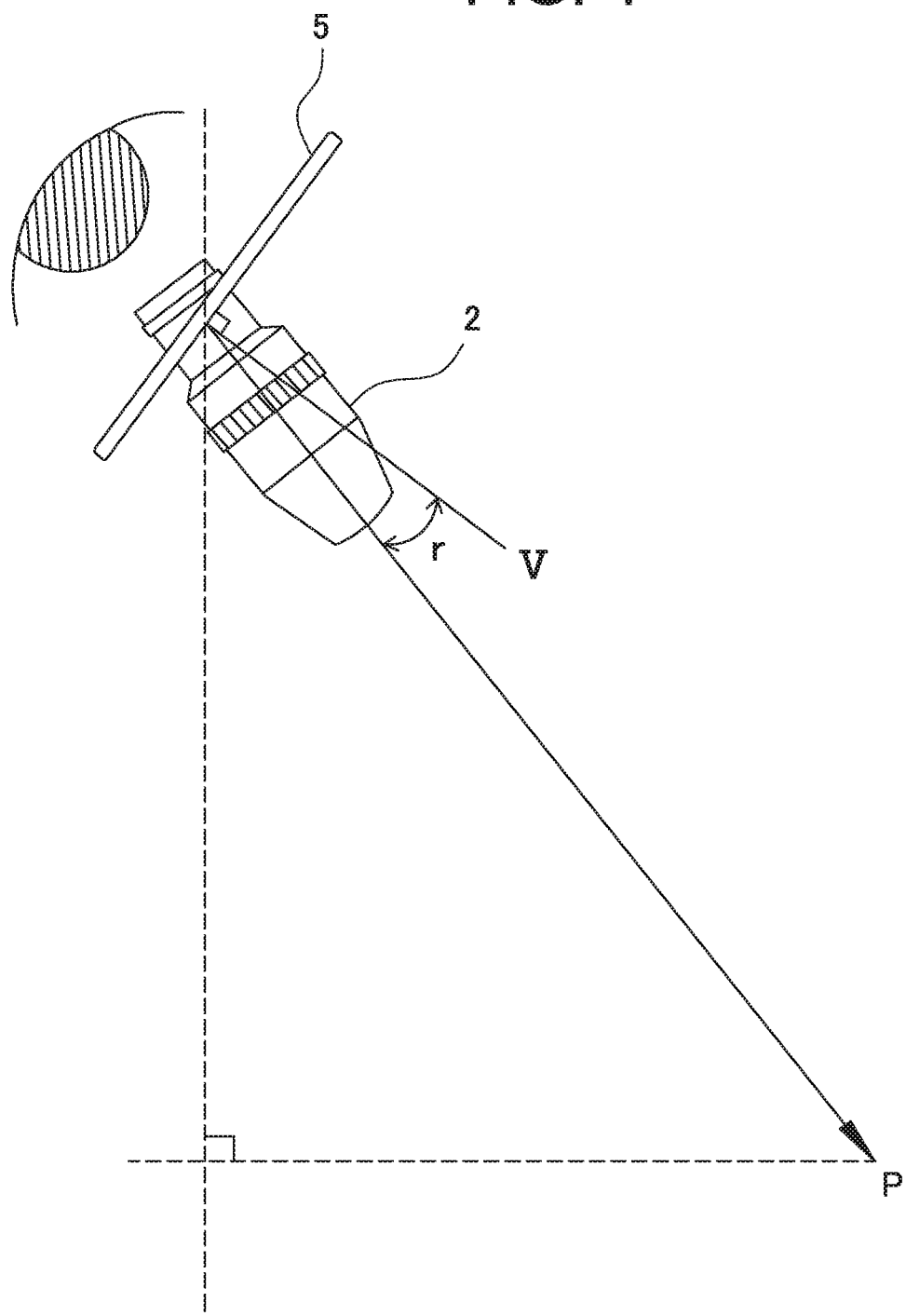
FIG. 4 illustrates an explanatory view about a downward mounting angle r in attaching the loupes to carrier lenses.
Figure 5:
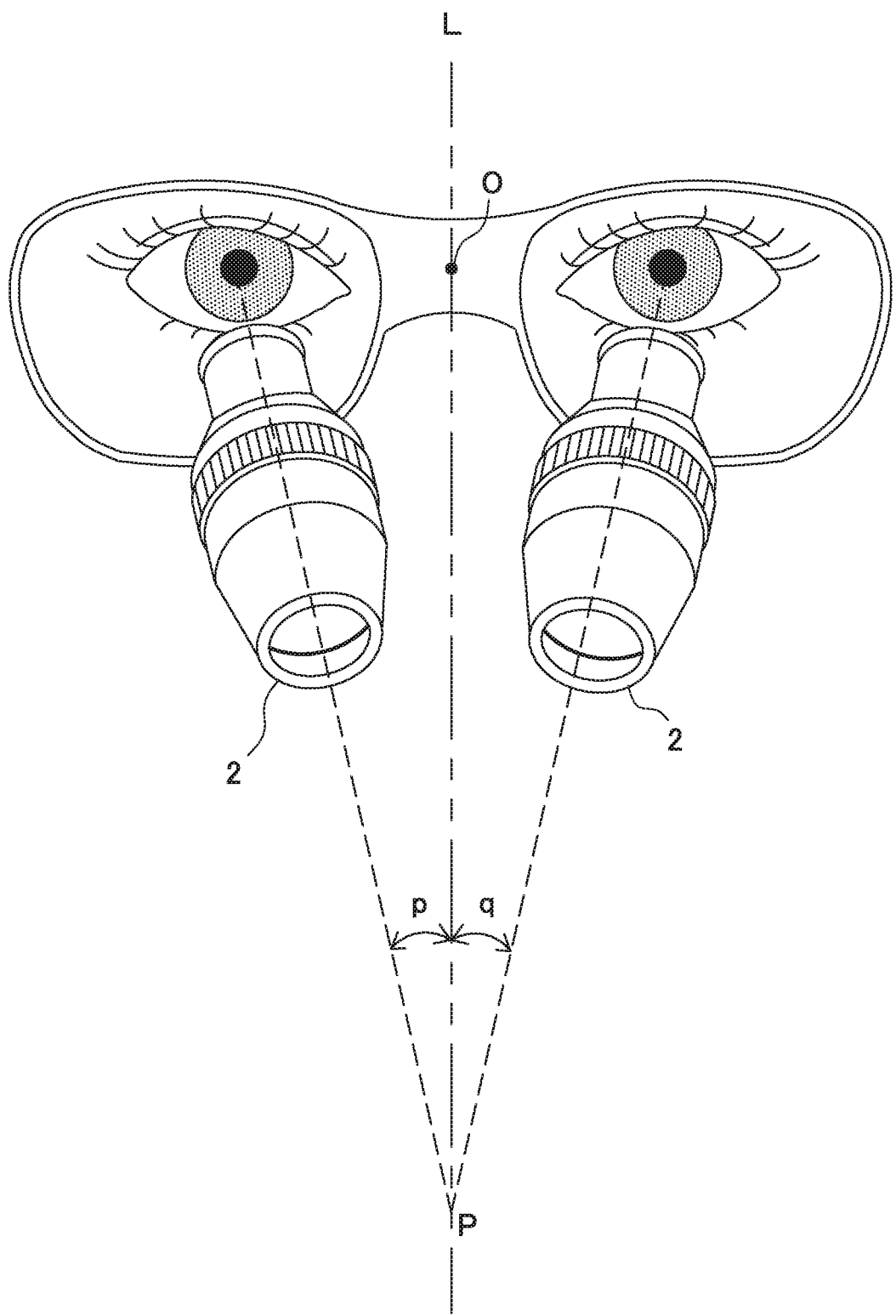
FIG. 5 illustrates an explanatory view about inside mounting angles p and q in attaching the loupes to the carrier lenses.

Accordingly, as shown in FIG. 4, each of the left and right loupe bodies 2 is attached, while tilting with respect to an upright line V perpendicular to the plane of the carrier lens 5. The loupe is attached so that the tilt angle is to tilt at a downward angle r (downward mounting angle) with respect to the upright line V. Further, in the horizontal direction, as shown in FIG. 5, the left and right loupe bodies 2 are attached to respectively tilt at angle p and angle q (inside mounting angle) toward a center line L connecting between the center O of the glasses frame 1 and the surgical portion P.

Thus, when the loupe bodies 2 are fitted into holes cut in the carrier lenses 5 and mounted, the bodies are fixed to the carrier lenses 5 in a state of keeping the tilt of the downward mounting angle r and inside mounting angles p, q. Thus, corresponding to an individual user, the downward mounting angle r and inside mounting angles p, q are prescribed to manufacture the binocular loupes 10, and the user adjusts the magnification of the loupe bodies 2, and thereby enlarges an observation target portion to be easy to see.

The downward mounting angle r and inside mounting angles p, q are different corresponding to postures that the user of the binocular loupes 10 takes in operation and features such as a pupillary distance (PD) and the like, and are measured in advance. As a measurement method in this case, there are various kinds of methods such that a user actually reproduces operation postures to perform actual measurement on the angles with a measure and the like, and Japanese Patent Gazettes No. 5652973 and 5311601 disclose a method of measuring based on images obtained by shooting operation postures of an operator.

Figure 6:
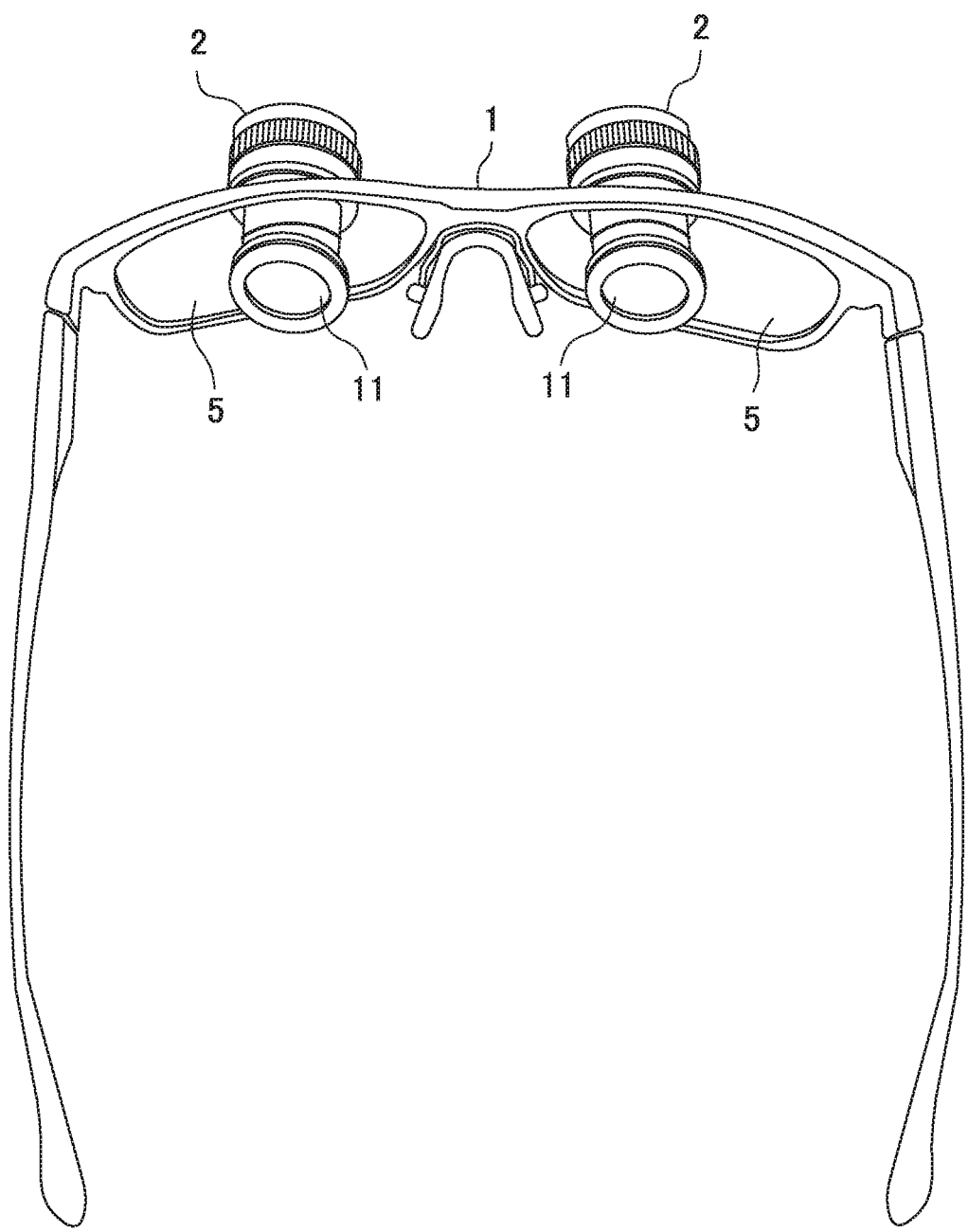
FIG. 6 illustrates an explanatory view, looking at the loupes mounted on the carrier lenses from the eyepiece side.

The corrective lenses 45 are disposed in the binocular loupes 10, thereby correct vision of far distance or near distance of a user, and since vision varies corresponding to physical conditions or environment, do not adapt sometimes. Accordingly, when the corrective lenses 45 do temporarily not adapt, as shown in FIG. 6, the user mounts focus adjustment lenses 11 on the eyepiece side of the loupe bodies 2, and the focal distance is thereby adapted to the varied vision. On the other hand, also with respect to a user who does not need correction of vision usually and forms the lenses 45 with glass lenses, when vision varies, the user uses the focus adjustment lenses 11 to adapt the focal distance.

Figure 7A:
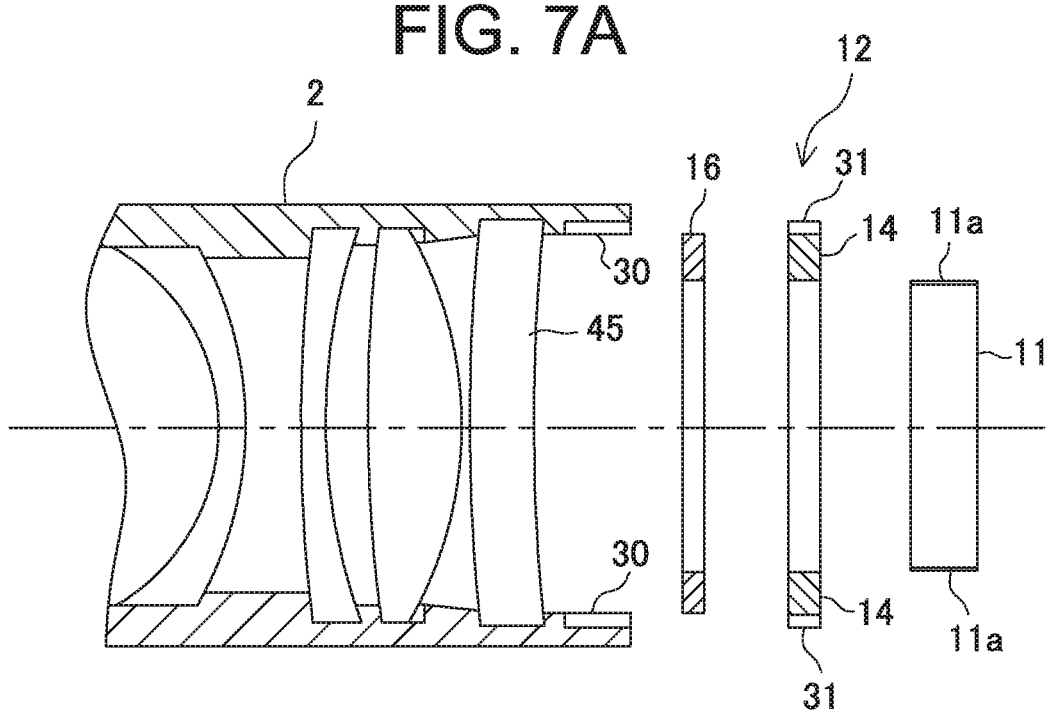
FIGS. 7A and 7B illustrate cross-sectional side views of a part of the eyepiece side of a loupe body and a focus adjustment unit of one Embodiment, where
Figure 7B:
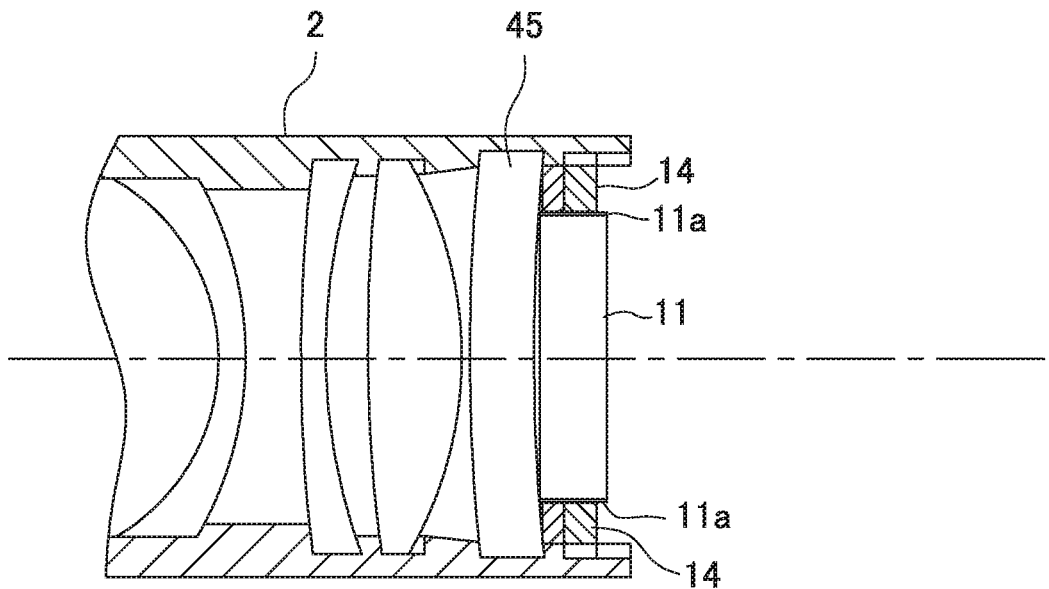

The focus adjustment lens 11 is mounted on the eyepiece unit of the loupe body 2 by the focus adjustment unit 12. FIGS. 7A and 7B illustrate a configuration of the loupe body 2 and focus adjustment unit 12, and each focus adjustment unit 12 is provided with the focus adjustment lens 11, holding ring 14, and magnet ring 16 into which the focus adjustment lens 11 is fitted.

In the focus adjustment lens 11, a magnetic body 11a is formed at the peripheral edge. The magnetic body 11a is formed by applying or spraying fine particles of magnetic material with small particle diameters to the surface at the peripheral edge of the magnet ring 16 to magnetize. Alternatively, a thin film of magnetic material may be formed on the surface by sputtering, deposition and the like. Used as the magnetic material are iron oxide, chromium oxide, cobalt, ferrite, neodymium and the like which do not contain impurities.

The magnetic body 11a may be formed using a ring of magnetic body such as stainless. In this case, the focus adjustment lens 11 is fitted and fixed into an annular ring of the magnetic body 11a of the ring. In addition, in order to protect the outside surface of the magnetic body 11a, it is preferable to apply surface treatment by epoxy coat and the like.

The magnet ring 16 is a ring having an inside diameter substantially equal to an outside diameter of the focus adjustment lens 11 provided with the magnetic body 11a at the peripheral edge, and an outside diameter thereof is substantially equal to an inside diameter of the lens tube of the loupe body 2. Accordingly, the magnet ring 16 is inserted into the lens tube of the loupe body 2.

The holding ring 14 is made of metal, and is drawn by the magnet ring 16. Then, as the magnet ring 16, the ring 14 is formed of a ring having an inside diameter substantially equal to the outside diameter of the focus adjustment lens 11. Further, at the peripheral edge of the holding ring 14 is formed a male screw 31 engaging in a female screw 30 cut in an inner circumferential wall on the opining side of the lens tube of the loupe body 2.

Accordingly, in placing the focus adjustment unit 12 in the eyepiece unit of the loupe body 2, as shown in FIG. 7A, first, the magnet ring 16 is inserted from the opening on the eyepiece side of the loupe body 2 to come into contact with the corrective lens 45, and next, the holding ring 14 is inserted from the opening, while rotating the screw. By this means, the magnet ring 16 is fixed in a state brought into contact with the corrective lens 45.

Next, the focus adjustment lens 11 is inserted into the lens tube of the loupe body 2, and in this case, the inside diameter of each of the magnet ring 16 and the holding ring 14 matches with the outside diameter of the focus adjustment lens 11. Therefore, as shown in FIG. 7B, the user is capable of shifting the focus adjustment lens 11 inside annular rings of the rings 14, 16, until the lens 11 comes into contact with the corrective lens 45. Then, the focus adjustment lens 11 is held inside the loupe body 2 by attraction of the magnet ring 16 and the magnetic body 11a. Accordingly, the user peers through the focus adjustment lens 11, and is thereby capable of observing an image of the object for observation through the optical system of the loupe body 2.

The holding ring 14 is made of metal drawn to the magnet ring 16, and connection between the focus adjustment unit 12 and the loupe body 2 is thereby reliable.

As described above, in the focus adjustment unit 12, the magnet ring 16 and holding ring 14 are fixed and attached inside the loupe body 2, and only the focus adjustment lens 11 shifts inside the annular rings of the magnet ring 16 and holding ring 14, and is detachable from the loupe body 2. Accordingly, a plurality of focus adjustment lenses 11 with different levels of power to compensate for a change in vision is prepared as attachment accessories of the binocular loupes 10, and when the focal distance of the loupe body 2 is not matched, the user selects the focus adjustment lens 11 most suitable for near sight and far sight corresponding to the vision at the time, inserts into the loupe body 2, and is thereby capable of correcting the vision with ease.

Figure 8A:
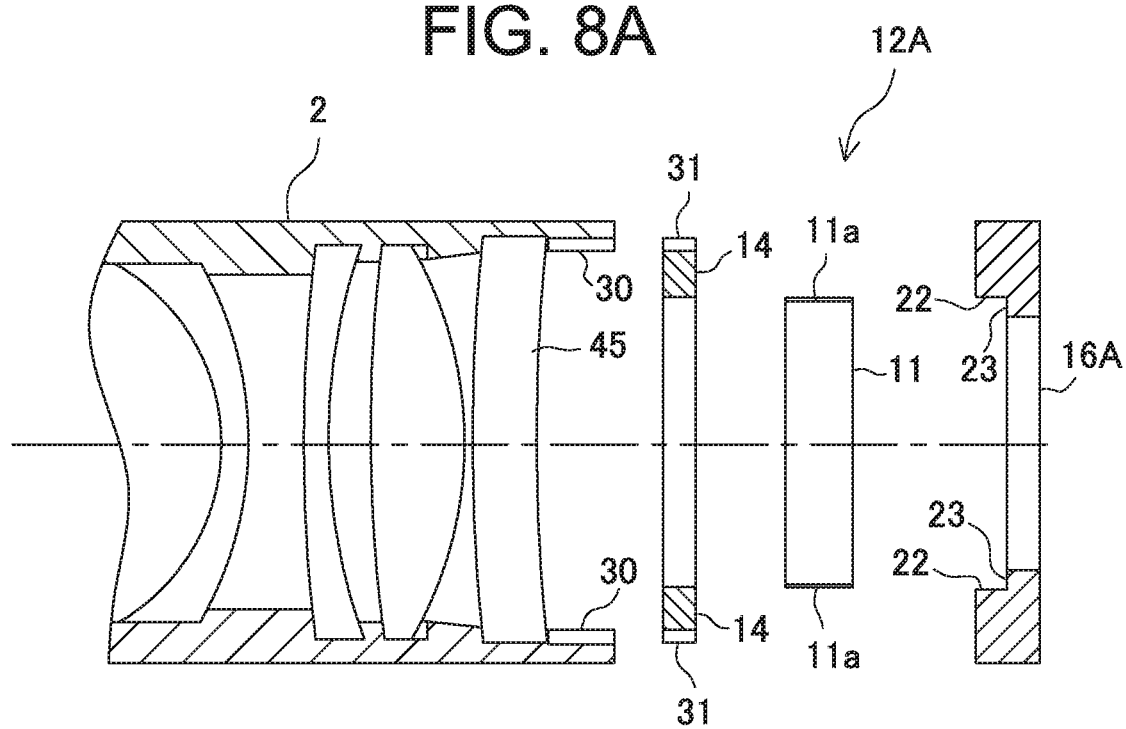
FIGS. 8A and 8B illustrate cross-sectional side views of a part of the eyepiece side of the loupe body and a focus adjustment unit of another Embodiment, where
Figure 8B:
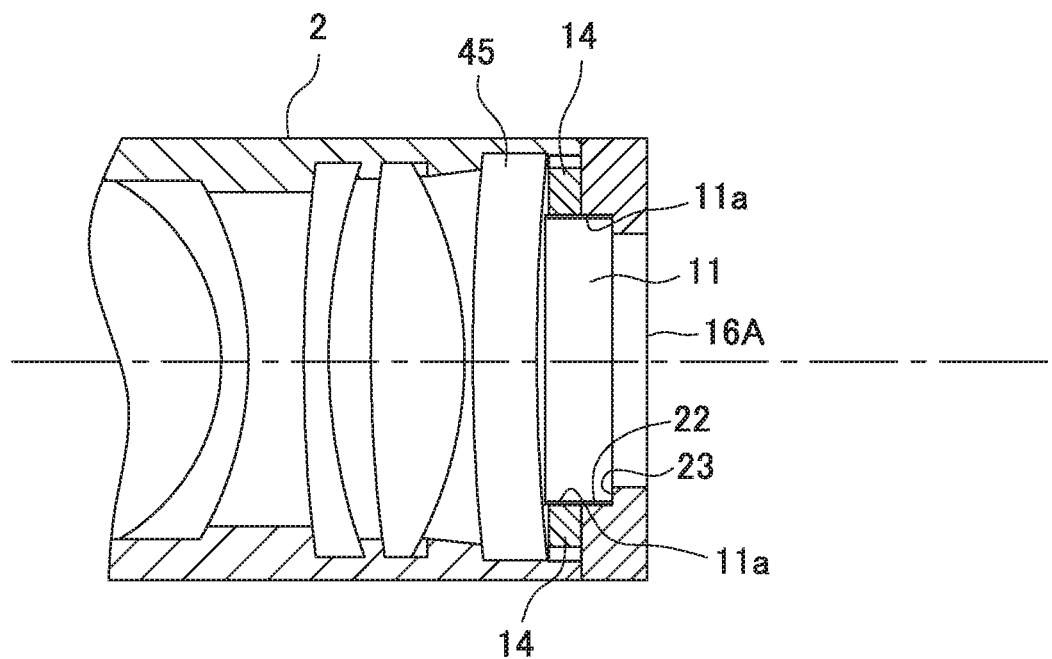

Another Embodiment of the focus adjustment unit will be described. A focus adjustment unit 12A in FIGS. 8A and 8B is provided with the focus adjustment lens 11 and holding ring 14 that are the same in the focus adjustment unit 12. Accordingly, the focus adjustment lens 11 has the magnetic body 11a at the peripheral edge drawn to the magnet, and at the peripheral edge of the holding ring 14 is formed the male screw 31 engaging in the female screw 30 cut in the inner circumferential wall on the opining side of the lens tube of the loupe body 2.

However, in the case of the focus adjustment unit 12A, a magnet ring 16A is different in shape from the magnet ring 16 of the focus adjustment unit 12, and is of two-stage configuration having a lens receiving unit 22 having an inside diameter substantially equal to the outside diameter of the focus adjustment lens 11 and a press unit 23 having an inside diameter smaller than the outside diameter of the focus adjustment lens 11.

Then, in placing the focus adjustment unit 12A in the eyepiece unit of the loupe body 2, as shown in FIG. 8A, first, the holding ring 14 is inserted from the opening on the eyepiece side of the loupe body 2, while rotating the screw, and next, the focus adjustment lens 11 is fitted and shifted into the annular ring of the holding ring 14 to come into contact with the corrective lens 45. By this means, the focus adjustment lens 11 is held by the holding ring 14 fixed threadably.

Next, the magnet ring 16A is brought into contact with the eyepiece unit of the loupe body 2, so that the focus adjustment lens 11 is stored inside the lens receiving unit 22. Accordingly, in the focus adjustment lens 11, the magnetic body 11a is drawn to the magnet ring 16A and holding ring 14, is pressed against the holding ring 14 by the press unit 23 of the magnet ring 16A, and is held inside the loupe body 2. The user peers through the focus adjustment lens 11 from the opening of the magnet ring 16A, and observes an image of the object for observation through the optical system of the loupe body 2.

Accordingly, in the focus adjustment unit 12A, an optimal focus adjustment lens 11 is selected from among focus adjustment lenses 11 with different levels of power beforehand prepared to compensate for a change in vision, and is inserted into the loupe body 2, the inserted focus adjustment lens 11 is mounted on the magnet ring 16A to be stored in the lens receiving unit 22, and the user is thereby capable of correcting the vision.

Then, as in the case of the focus adjustment unit 12, also in the focus adjustment unit 12A, the holding ring 14 is made of metal drawn to the magnet ring 16, and connection between the focus adjustment unit 12A and the loupe body 2 is thereby reliable.

As described above in detail, in the focus adjustment units 12, 12A according to the present invention, various focus corrective lenses 11 with different focal distances are prepared to correct vision of far distance or near distance, and when a wearer of the binocular loupes 10 wants to change to a proper depth of focus corresponding to a state of vision and an ambient brightness state at the time, or corresponding to operation performed in a seated position or standing position, the wearer selects the focus adjustment lens 11 adapted to vision at the time, and mounts on the eyepiece unit of the loupe body 2. Accordingly, it is possible to provide the binocular loupes 10 capable of adjusting to an optimal focal distance, only by mounting the focus adjustment lens 11.

Figure 9:
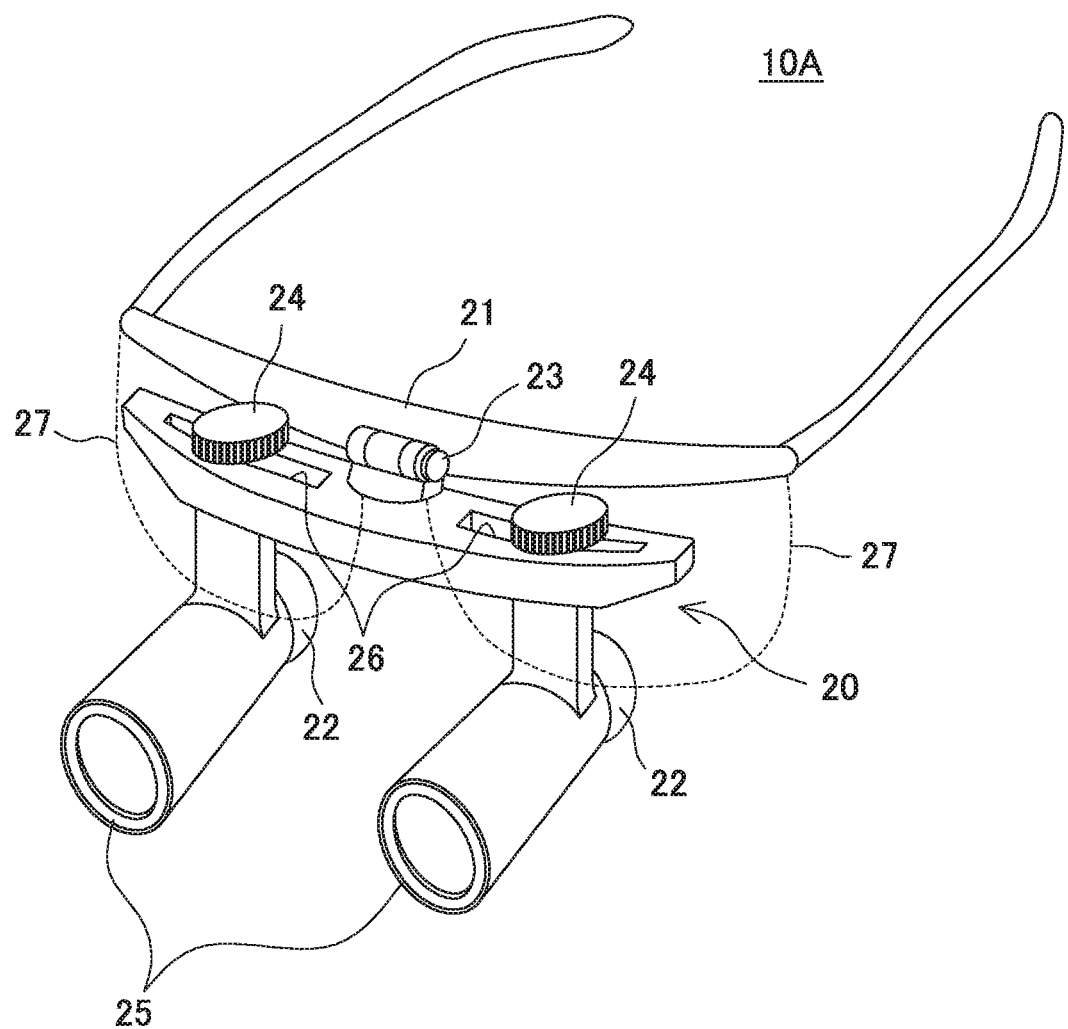
FIG. 9 illustrates an entire configuration view of a different type of binocular loupes to apply the present invention.

As described previously, the present invention is applicable to binocular loupes without having the carrier lenses, and FIG. 9 shows one example of this type of binocular loupes. The binocular loupes 10A have structure of hanging a loupe body 20 having a pair of left and right loupe bodies 25 on a glasses frame 21 with a rotatable shaft 23. Then, by adjusting screws 24, the loupe body 20 enables the loupe bodies 25 to shift to a position in the vertical direction and leftward/rightward inside slits 26 corresponding to a pupillary distance of an observer. Further, the loupe bodies 25 are supported rotatably by shafts in the perpendicular direction of the screws 24, and it is possible to also adjust the inside mounting angles. Then, the downward mounting angle of the loupe bodies 25 is adjustable by rotating about the shaft 23 as an axis.

Then, the loupe body 25 enables any of the focus adjustment units 12, 12A including the focus adjustment lens 11 to be placed in the eyepiece unit. In addition, this type of binocular loupes includes a type of attaching corrective lenses 27 to the glasses frame without providing the corrective lenses 45 as shown in FIG. 2, and in this case, an observer peers into the loupe bodies 25 through the focus adjustment lenses 11 over the corrective lenses 27.

In the type of binocular loupes 10A thus without mounting the loupes on the carrier lenses, the pupillary distance, inside mounting angle and downward mounting angle are not fixed, and are adjustable arbitrarily. Further, instead of the glasses frame 21, the loupe body 20 may be configured to be hanged on a head band to support.

Figure 10:
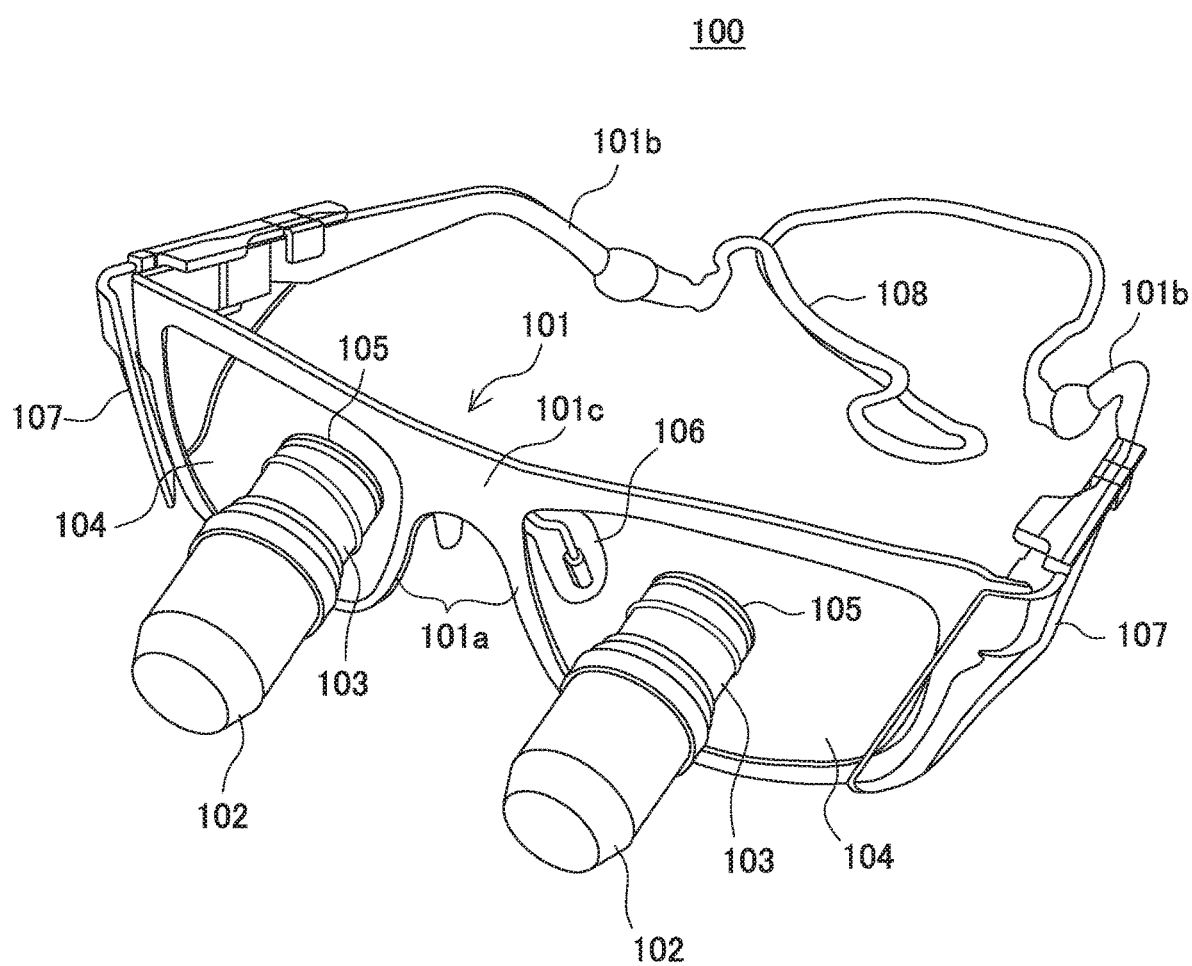
FIG. 10 illustrates a configuration view of binocular loupes according to Embodiment 2 of the present invention.
Figure 11:
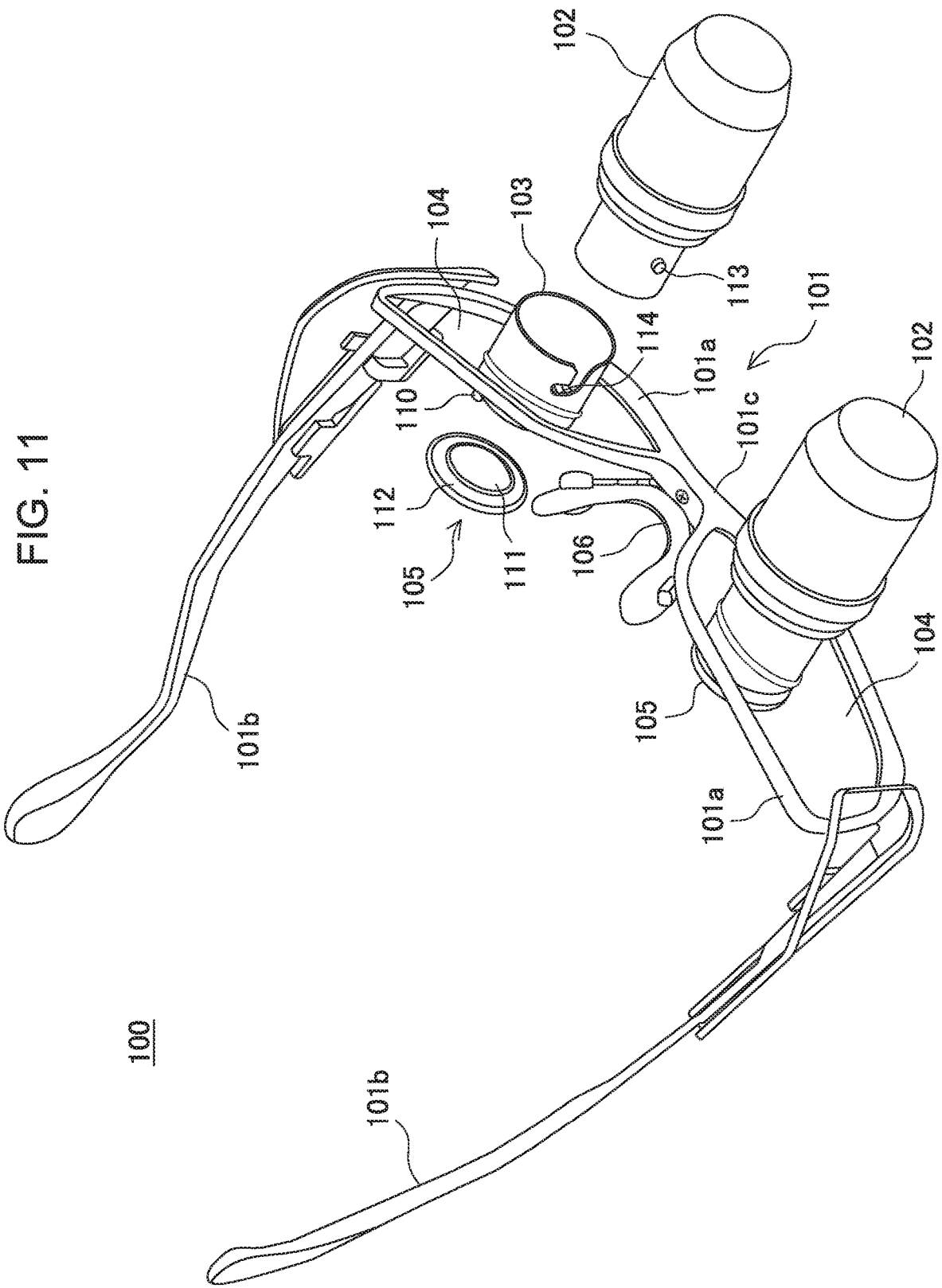
FIG. 11 illustrates an explanatory view of a state in which the binocular loupes of FIG. 10 are reversed upside down and one of loupe bodies is removed.

Embodiment 2 of the present invention will be described next. Binocular loupes 100 shown in FIGS. 10 and 11 are comprised of a glasses frame 101, loupe bodies 102 that correspond to both left and right eyes to enlarge an image targeted for operation, a pair of holders 103 that respectively hold the loupe bodies 102, left and right carrier lenses 104 that are loupe support members to attach the holders 103 to the glasses frame 101, and left and right focus adjustment units 105 to guarantee vision of a user.

The glasses frame 101 has substantially the same structure as the normal glasses, and has rims 101a into which the carrier lenses 104 are fitted, a bridge 101c that connects between temples 101b put on ears of an observer and both the rims 101a, and nose pad portions 106. Used as materials forming the glasses frame 101 are metal such as titanium, synthetic resin and the like hard to rust with flexibility. Then, when necessary, it is possible to attach, to the temples 101b, shield members 107 for protecting both sides of a face of a wearer and a strap 108 to hold in a state of wearing the binocular loupes 100.

The carrier lenses 104 are provided with openings to support the holders 103 for holding the loupe bodies 102 and focus adjustment units 105 at opposite ends thereof, and the holders 103 are fitted into the openings and are fixed in a state of maintaining predetermined angles with respect to faces of the carrier lenses 104. Materials forming the carrier lenses 104 do not need to be always transparent, but are preferably transparent to widen the eyesight in the hand direction of the observer. Further, in the case of requiring correction of vision, corrective lenses are used, and in the case of no need of correction of vision, the lenses may be simple transparent glass. Materials of the lens in this case are glass or plastic. Accordingly, as well as the function as the loupe support member for supporting the loupe bodies, the carrier lenses 104 are also provided with the vision correction function as required.

The loupe body 102 incorporates an optical system for enlargement, similar to the body described in FIG. 2, adjusted at a predetermined magnification, for example, a magnification of 2.5 times for an image targeted for observation.

Figure 12:
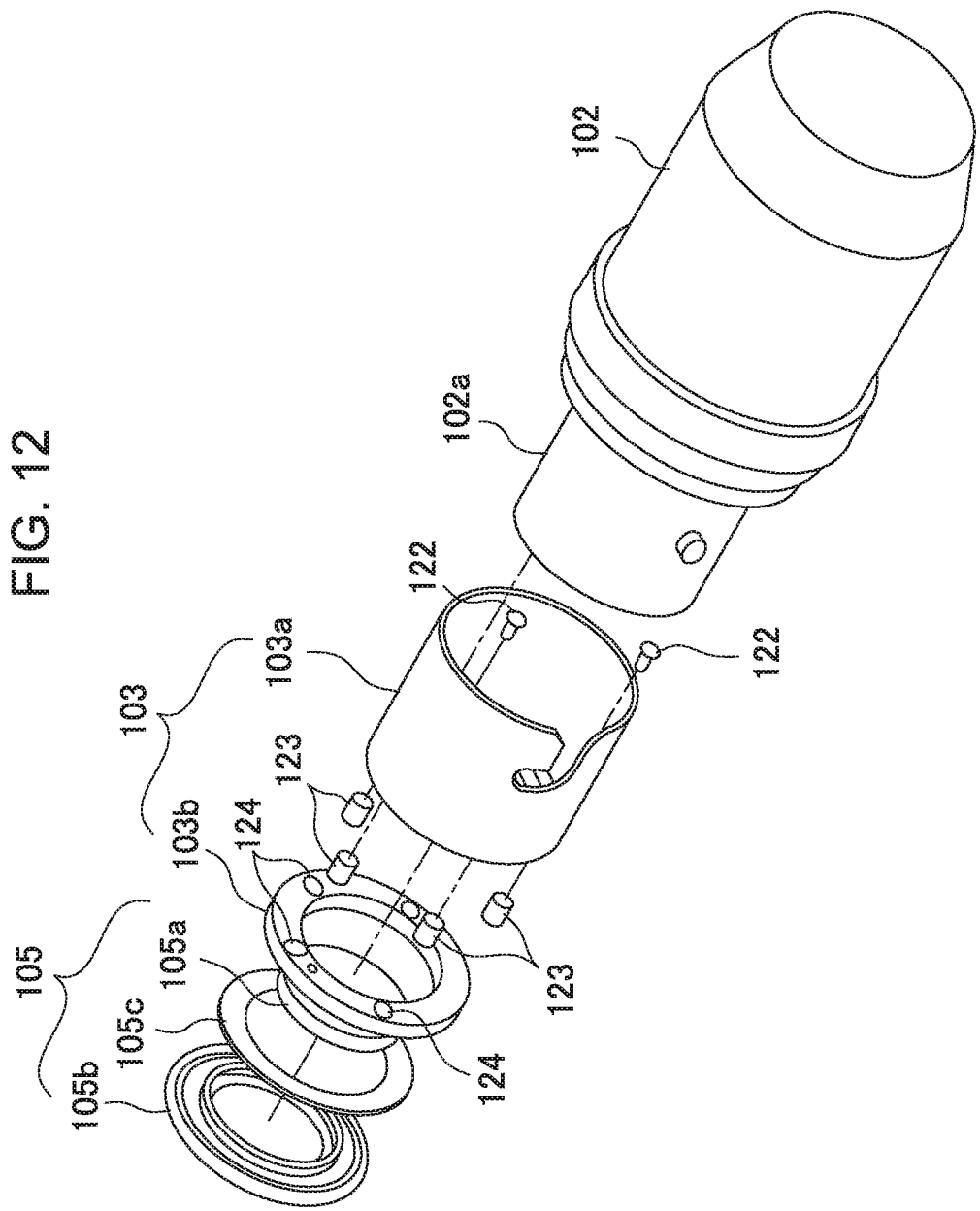
FIG. 12 illustrates an assembly configuration view of the loupe body, holder and focus adjustment unit in the binocular loupes of FIG. 10.
Figure 13:
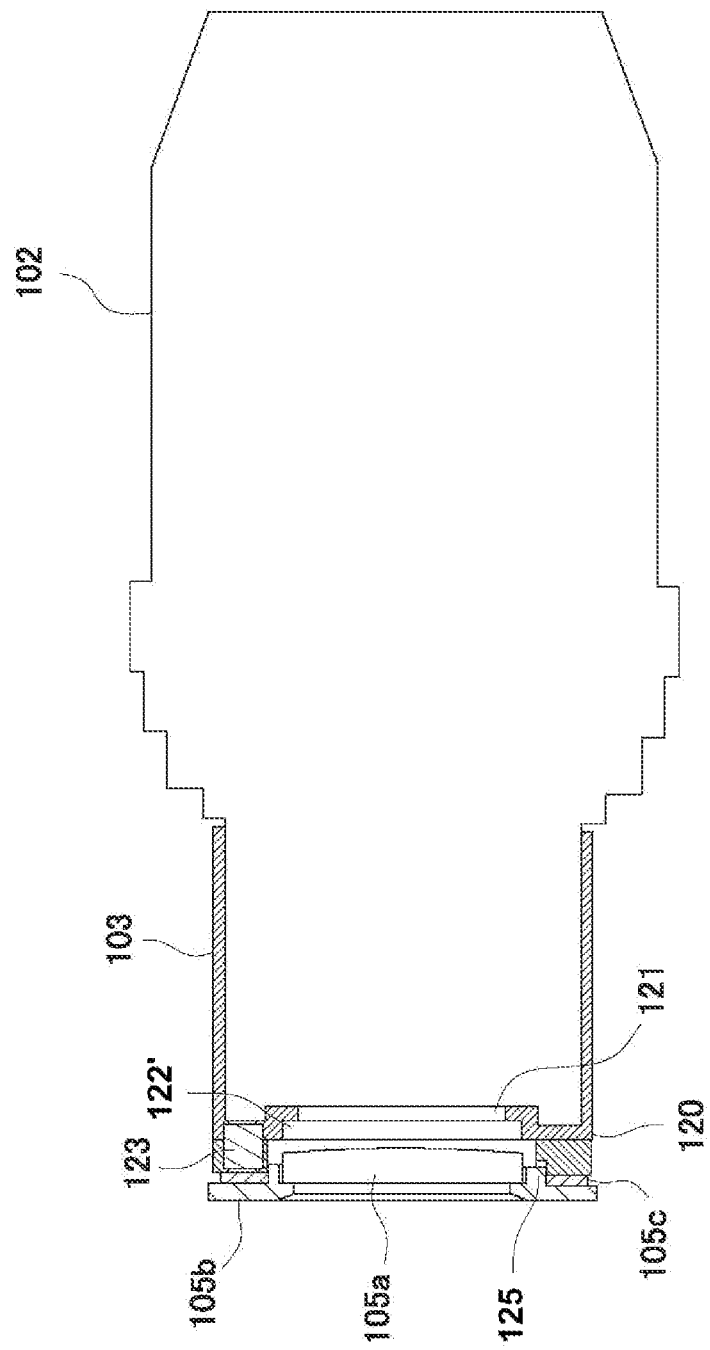
FIG. 13 illustrates a plan view showing the holder and focus adjustment unit in section in a state in which the loupe body, holder and focus adjustment unit in the binocular loupes of FIG. 10 are assembled.

As shown in FIG. 12, each of the holders 103 is comprised of a holder body 103a that is a cylindrical body with a bottom, and a magnet cover 103b. The holder body 103a has an inside diameter substantially equal to an outside diameter of an eyepiece tube 102a of the loupe body 102, and is provided with a through hole 121 at the center of a bottom portion 120 as a receiving unit of the inserted loupe body 102. In a peripheral edge portion of the bottom portion 120 with the through hole 121 formed, as shown in a cross-sectional view of FIG. 13, a level difference is formed, and into a portion with a large diameter of the level difference is fitted a circular transparent plate 122' to block the through hole 121. In the bottom portion 120 of the holder body 103a, five column-shaped pins 123 made of neodymium magnets are spaced at regular intervals along the circumferential direction so as to protrude outward in the axis direction, and are fastened by countersunk screws 122. The magnet cover 103b is comprised of a ring coming into contact with the peripheral edge of the bottom portion 120 of the holder body 103a, and a contact face thereof is provided with five concave portions 124 respectively fitting into the five pins 123. The magnet cover 103b is a first attachment unit for attaching the focus adjustment unit 105 to the holder 103.

Each of the focus adjustment units 105 is comprised of a focus adjustment lens 105a, a holding ring 105b for holding the focus adjustment lens 105a, and a detachable ring 105c formed of a magnetic body. The holding ring 105b having the shape of a ring is provided with, on its circumferential face, a circular protrusion 125. An inside diameter of the protrusion 125 is substantially equal to an inside diameter of the focus adjustment lens 105a, and the focus adjustment lens 105a is fitted into the circular protrusion 125 and is held. An inside diameter of the detachable ring 105c is substantially equal to an outside diameter of the circular protrusion 125, and the protrusion 125 is fitted into the detachable ring 105c. Accordingly, at the peripheral edge of the focus adjustment lens 105a, the magnetic body (detachable ring 105c) drawn to the pins 123 is provided via the protrusion 125.

In order to correct the vision when a user of the binocular loupes 100 enlarges and observes a target with the left and right loupe bodies 102, the focus adjustment lens 105a is to correct a far distance or near distance used in accordance with the loupe body 102 as necessary. Accordingly, a plurality of focus adjustment units 105 provided with focus adjustment lenses 105a respectively with different focal distances is prepared, and when the user wants to adjust the focus on an observation target through the loupe bodies 102, by removing the focus adjustment unit 105 by releasing coupling between the detachable ring 105c and the pins 123, it is possible to replace with the focus adjustment unit 105 with a proper focal distance. Thus, the binocular loupes 100 of this Embodiment are to replace the focus adjustment lens 105a by replacing the focus adjustment unit 105.

Figure 14:
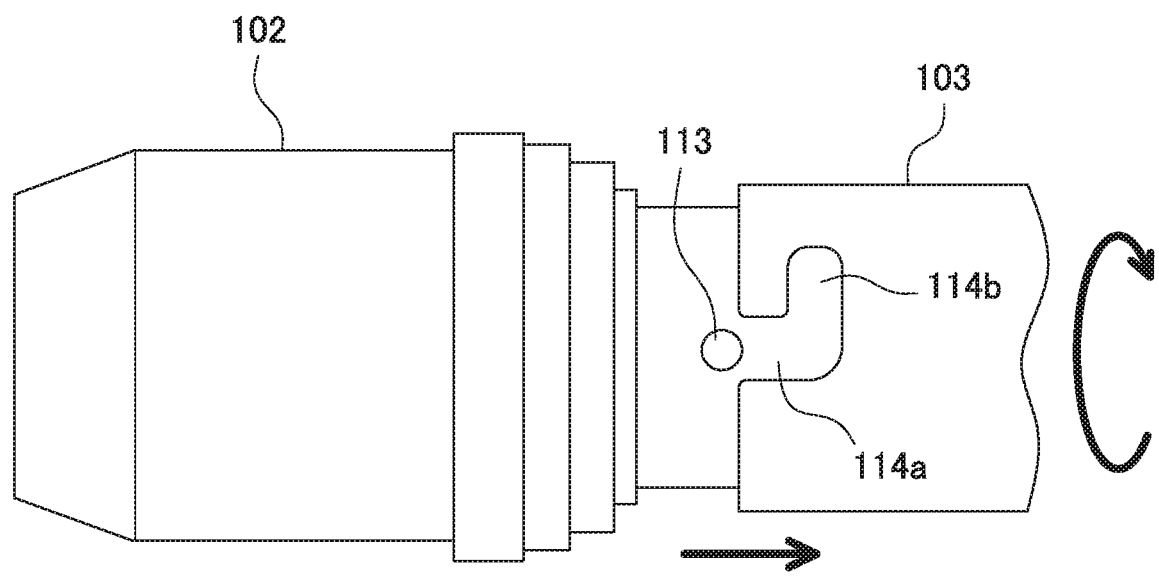
FIG. 14 illustrates a side elevational view of a configuration of a second attachment unit in the binocular loupes of FIG. 10.

As shown in FIG. 14, the holder body 103a is provided with a hook-shaped groove 114 having an insertion hole 114a formed along an insertion direction of the loupe body 102, and a locking hole 114b formed in a direction orthogonal to the insertion direction, while being continued to the insertion hole 114a. Then, a protrusion 113 fitted into the groove 114 is provided on the outer surface of the eyepiece tube 102a of the loupe body 102. By this means, in inserting the eyepiece tube 102a into the holder 103, the protrusion 113 is moved to the insertion hole 114a, and then, the loupe body 102 is rotated to fit the protrusion 113 into the locking hole 114b, and is thereby attached to the holder 103. Accordingly, the groove 114 is a second attachment unit to attach the loupe body 102 to the holder 103.

Thus, in the loupe body 102, since engagement between the groove 114 of the holder 103 and the protrusion 113 is removable, when the user wants to replace with the loupe body 102 with a different magnification and the like, the user removes the loupe body 102 from the holder 103, and is capable of replacing with another loupe body 102. Accordingly, in the case where the need for changing a magnification arises corresponding to an observation target of a work operation portion W, it is possible to replace with the loupe body 102 with the corresponding magnification.

The holders 103 are fitted into the openings pierced in the carrier lenses 104, and the attached loupe bodies 102 are fixed at predetermined angles with respect to the faces of the carrier lenses 104. In other words, in the binocular loupe 100, since the loupe bodies 102 are removable, in order that focus of the loupe bodies 102 installed in the holders 103 is directed toward an observation target portion, the holders 103 are attached at a predetermined downward mounting angle r and inside mounting angles p and q with respect to the planes of the carrier lenses 104 as reference.

Figure 15:
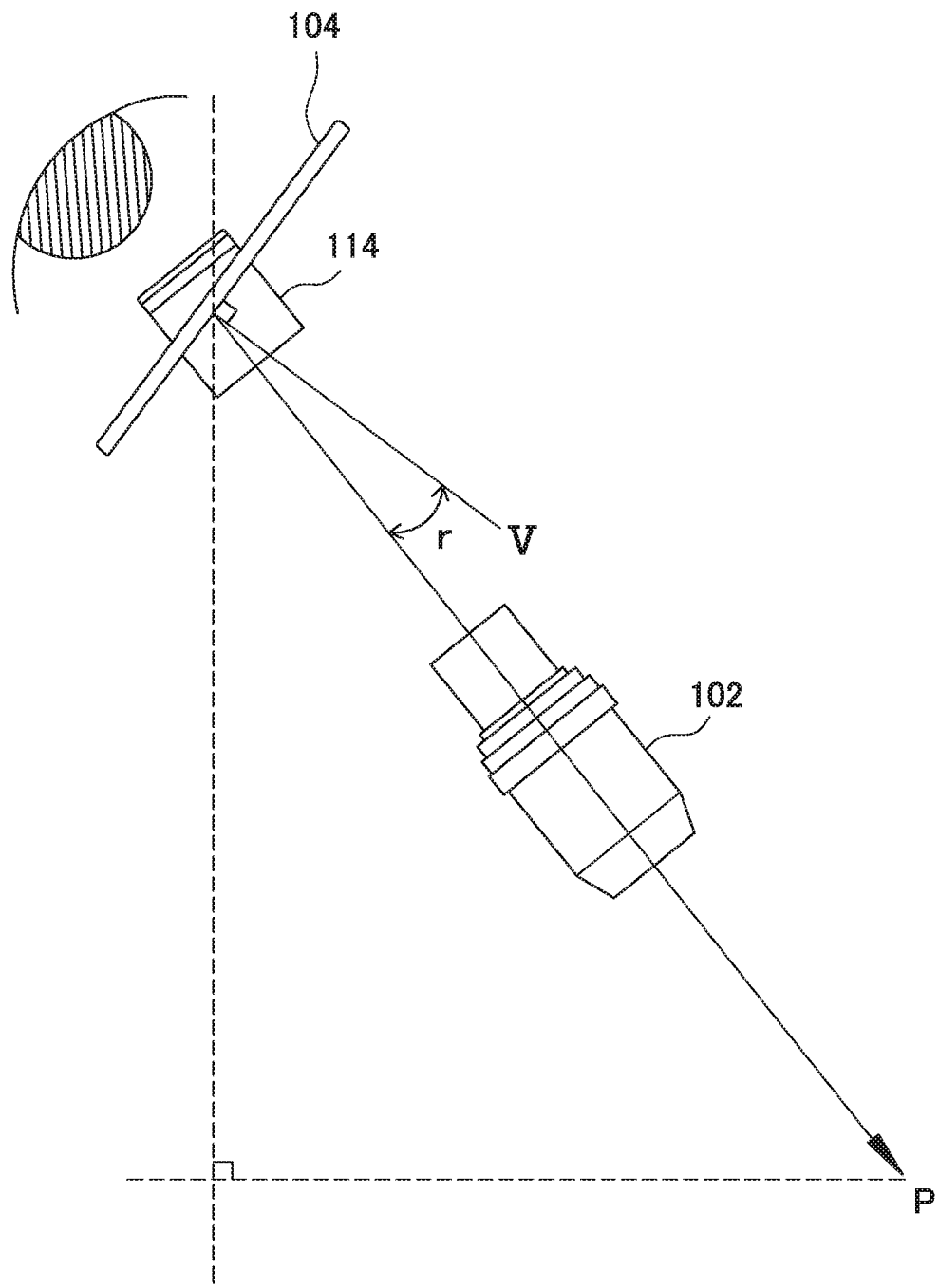
FIG. 15 illustrates an explanatory view of a downward mounting angle in attaching holders to carrier lenses in the binocular loupes of FIG. 10.
Figure 16:
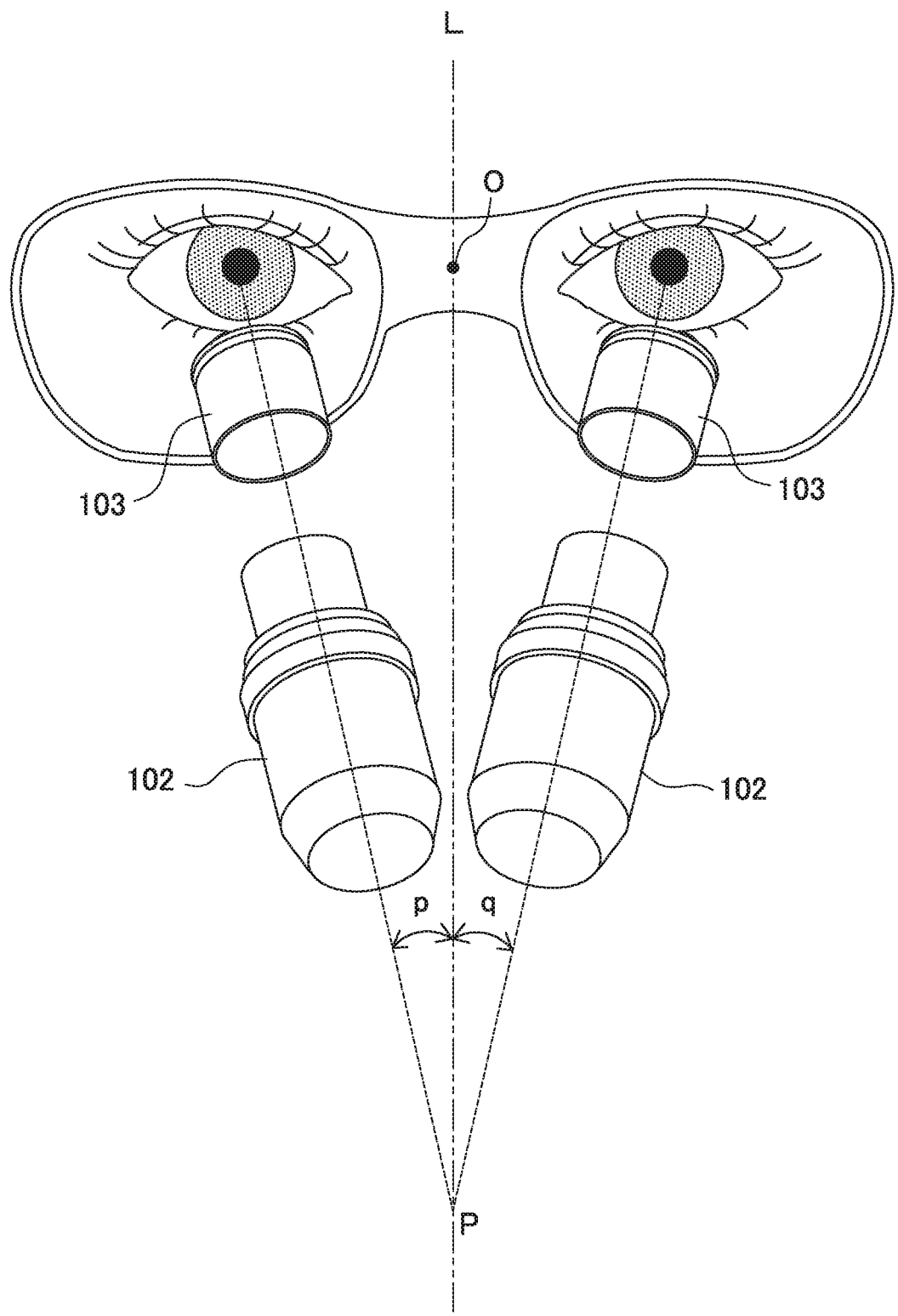
FIG. 16 illustrates an explanatory view about inside mounting angles in attaching the holders to the carrier lenses in the binocular loupes of FIG. 10.

When the holders 103 are attached to the carrier lenses 104 fixedly at the downward mounting angle r, in the case where the user takes a leaning forward posture of work, as shown in FIG. 15, the optical axes of the left and right loupe bodies 102 are matched with a height position of a work portion P. In addition thereto, by attaching the holders 103 to the carrier lenses 104 at the inside mounting angles p and q, as shown in FIG. 16, the optical axes of the left and right loupe bodies 102 converge to the work portion P.

When the downward mounting angle r and inside mounting angles p and q of the holders 103 are determined, openings to insert the holders 103 are provided in positions that correspond to the pupils of both eyes in the left and right carrier lenses 104, and the right holder 103 and left holder 103 are fixed and attached with an adhesive and the like so as to protrude from the faces of the carrier lenses 4 at the downward mounting angle r and inside mounting angle p and at the downward mounting angle r and inside mounting angle q, respectively. Then, the focus adjustment units 105 and loupe bodies 102 are attached to the first and second attachment units of the holders 103, respectively, and the binocular loupes 100 are used.

As described above in detail, in the binocular loupes 100, the holder 103 is fixed to the carrier lens 104, the focus adjustment unit 105 is made detachable by the magnet cover 103b that is the first attachment unit provided on the objective side of the holder 103, and the loupe body 102 is made detachable by the groove 114 that is the second attachment unit provided on the eyepiece side of the holder 103. Accordingly, in the case of changing the magnification corresponding to an observation target of the work operation portion W, it is possible to replace with the loupe body 2 of the corresponding magnification. Further, in the case of correcting the vision, it is possible to replace with the focus adjustment unit 105 with a proper focal distance. The loupe body 102 may be provided with the zoom function capable of adjusting the magnification itself. In this case, a plurality of loupe bodies 102 for enabling magnifications to be adjusted in different ranges is prepared, and the user replaces with the loupe body 102 provided with required magnifications in an adjustable range to use.

In addition, the first attachment unit is not limited to attachment by attraction of magnets, and may be the configuration to attach by the fit between the groove and the protrusion as in the second attachment unit, and conversely, the second attachment unit may be the configuration to attach by attraction of magnets.

Figure 17:
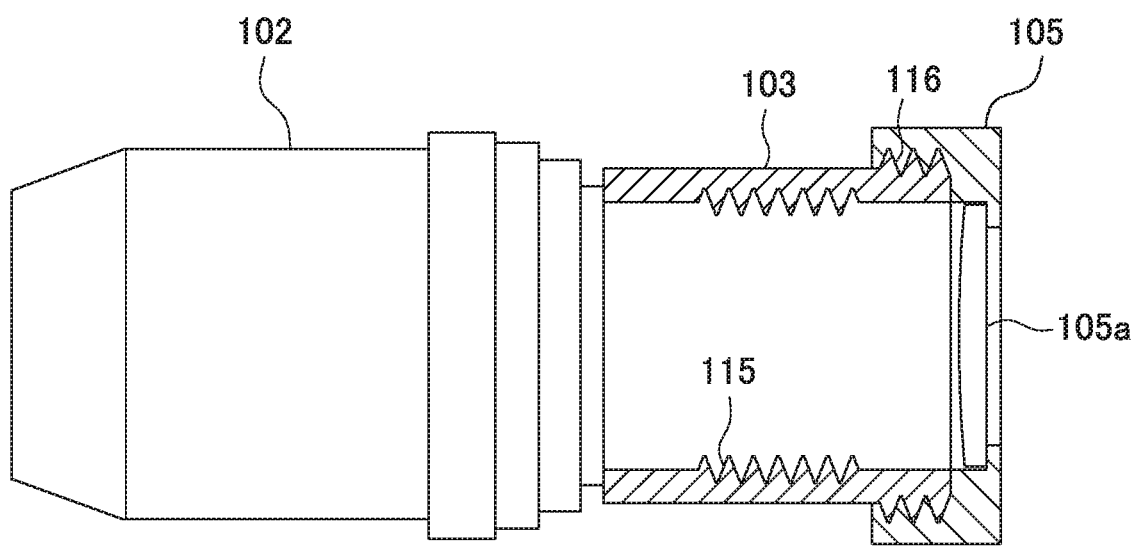
FIG. 17 illustrates a side elevational view of another configuration example of first and second attachment units in the binocular loupes of FIG. 10.

FIG. 17 shows a modification of the first attachment unit and second attachment unit to connect by screws. A first attachment unit 116 herein is comprised of a screw unit, formed in the outer region of a connection side edge portion to the focus adjustment unit 105 of the holder 103, to screw with a female screw formed in the inner region of the focus adjustment unit 105. Then, a second attachment unit 115 is comprised of a screw unit formed in the inner region of the holder 103 to screw with a male screw formed in the outer region of the eyepiece tube 102*a* of the loupe body 102.

INDUSTRIAL APPLICABILITY

The present invention relates to binocular loupes used in medical operations and precision operation which are binocular loupes capable of easily adjusting to the focal distance corresponding to varying vision of a user, and has industrial applicability.

DESCRIPTION OF THE SYMBOLS

1 Glasses frame
2 Loupe body
10 Binocular loupes
10A Binocular loupes
11 Focus adjustment lens
12 Focus adjustment unit
12A Focus adjustment unit
14 Holding ring
16 Magnet ring
21 Glasses frame
22 Lens receiving unit
23 Press unit
103 Holder
103*b* Magnet cover (first attachment unit)
105 Focus adjustment unit
105*a* Focus adjustment lens
105*b* Holding ring
105*c* Detachable ring (magnetic body)
114 Groove (second attachment unit)

What is claimed is:

1. Binocular loupes with an optical system for enlarging an object, comprising:
   a pair of loupe bodies, each of the pair of loupe bodies including an eyepiece unit and a focus adjustment unit disposed in the eyepiece unit, the focus adjustment unit including
       a focus adjustment lens having a magnetic body at a periphery edge thereof,
       a magnet ring fitted into each of the pair of loupe bodies to contact with an inner peripheral edge of the eyepiece unit to be thereby held, the focus adjustment lens being disposed inside and attracted to the magnet ring, and
       a holding ring into which the focus adjustment lens is fitted,
   wherein the focus adjustment lens is held detachably to each of the pair of loupe bodies through the magnetic bodies being attracted to the magnet ring,
   the holding ring is fixed to the eyepiece unit to cover the magnet ring,
   the magnet ring and the holding ring include holes having inner diameters substantially same as an outer diameter of the focus adjustment lens, respectively,
   the focus adjustment lens is disposed in the holes such that the magnetic body is attracted to the magnet ring and the focus adjustment lens is fixed to the eyepiece unit through the holding ring,
   each of the pair of loupe bodies includes a corrective lens at one end portion thereof, and the magnet ring is inserted into each of the pair of loupe bodies to contact the corrective lens, and
   the eyepiece unit includes a female screw unit on an inner region thereof and the holding ring includes a male screw unit on an outer region thereof, and the female screw unit and the male screw unit are engaged to each other to hold the magnetic ring which detachably holds the focus adjustment lens to the eyepiece unit through the holding ring.

* * * * *